(12) United States Patent
Landon et al.

(10) Patent No.: US 8,279,122 B2
(45) Date of Patent: Oct. 2, 2012

(54) MOBILE COMMUNICATIONS SYSTEMS AND METHODS RELATING TO POLARIZATION-AGILE ANTENNAS

(75) Inventors: David Glen Landon, Salt Lake City, UT (US); Cynthia Furse, Salt Lake City, UT (US)

(73) Assignee: University of Utah, Salt Lake City, UT (US)

( * ) Notice: Subject to any disclaimer, the term of this patent is extended or adjusted under 35 U.S.C. 154(b) by 0 days.

(21) Appl. No.: 13/431,761

(22) Filed: Mar. 27, 2012

(65) Prior Publication Data

US 2012/0188131 A1 Jul. 26, 2012

Related U.S. Application Data

(62) Division of application No. 11/959,322, filed on Dec. 18, 2007, now Pat. No. 8,154,455.

(60) Provisional application No. 60/875,699, filed on Dec. 18, 2006.

(51) Int. Cl.
*H01Q 1/38* (2006.01)
(52) U.S. Cl. ................... 343/700 MS; 343/846
(58) Field of Classification Search .................. 343/700, 343/846
See application file for complete search history.

(56) References Cited

U.S. PATENT DOCUMENTS

| | | | |
|---|---|---|---|
| 5,515,057 A * | 5/1996 | Lennen et al. | 342/357.27 |
| 6,049,705 A | 4/2000 | Xue | |
| 6,359,589 B1 * | 3/2002 | Bae | 343/700 MS |
| 6,697,641 B1 | 2/2004 | Shapira | |
| 6,771,218 B1 | 8/2004 | Lalezari et al. | |
| 6,771,223 B1 * | 8/2004 | Shoji et al. | 343/702 |
| 6,876,329 B2 * | 4/2005 | Milosavljevic | 343/700 MS |
| 6,889,061 B2 | 5/2005 | Shapira et al. | |
| 7,345,631 B2 * | 3/2008 | Kim et al. | 343/700 MS |
| 7,518,551 B2 | 4/2009 | Dybdal et al. | |
| 7,667,651 B2 | 2/2010 | McKivergan | |
| 2004/0266481 A1 | 12/2004 | Patel et al. | |
| 2005/0260954 A1 | 11/2005 | Hamalainen et al. | |
| 2006/0087385 A1 | 4/2006 | Fitzpatrick et al. | |

(Continued)

FOREIGN PATENT DOCUMENTS

EP 1515395 A1 3/2005

(Continued)

OTHER PUBLICATIONS

International Search Report and Written Opinion for PCT/US2007/08792 dated Nov. 28, 2008, 3 pages.

(Continued)

*Primary Examiner* — Tho G Phan
(74) *Attorney, Agent, or Firm* — Fulbright & Jaworski L.L.P.

(57) ABSTRACT

A wireless communication system can include polarization agile antennas to enable adaptation to the polarization characteristics of a changing propagation channel. In one embodiment, a mobile terminal can include one or more polarization-agile antennas, and can select polarization orientations that are preferentially propagated through the changing propagation channel. In another embodiment, a mobile terminal having two polarization-agile antennas can provide spatial diversity, polarization diversity, or combinations of both. Multiple-input multiple-output (MIMO) systems can include polarization-agile antennas to allow for switching between spatial and polarization diversity, combined spatial and polarization diversity, and various Eigen channel decompositions using spatial, polarization, and combined spatial and polarization dimensions. An extended polar normalization provides enhanced fidelity for methods of communications system modeling.

22 Claims, 5 Drawing Sheets

U.S. PATENT DOCUMENTS

2010/0194663 A1 * 8/2010 Rothwell et al. .............. 343/876

FOREIGN PATENT DOCUMENTS

| KR | 2002-0048496 A | 6/2004 |
|---|---|---|
| WO | WO-01/86823 A2 | 11/2001 |
| WO | WO-03/071715 A1 | 8/2003 |
| WO | WO-2005/099129 A1 | 10/2005 |
| WO | WO-2008/147467 A2 | 12/2008 |

OTHER PUBLICATIONS

Gao, S. et al., "Polarization-Agile Antennas," IEEE Antennas and Propagation Magazine, vol. 48, No. 3, Jun. 2006, pp. 28-37, IEEE, New Jersey.

Cox, D., "Antenna Diversity Performance in Mitigating the Effects of Portable Radiotelephone Orientation and Multipath Propagation," IEEE Transactions on Communications, vol. Com-31, No. 5, May 1983, IEEE, New Jersey.

* cited by examiner

MOBILE COMMUNICATIONS SYSTEMS AND METHODS RELATING TO POLARIZATION-AGILE ANTENNAS

CROSS-REFERENCE TO RELATED APPLICATIONS

This application is a division of U.S. application Ser. No. 11/959,322, filed Dec. 18, 2007 and entitled, "MOBILE COMMUNICATIONS SYSTEMS AND METHODS RELATING TO POLARIZATION-AGILE ANTENNAS," which claims the benefit of U.S. Provisional Patent Application No. 60/875,699, filed Dec. 18, 2006 and entitled, "MOBILE COMMUNICATIONS SYSTEMS AND METHODS RELATING TO POLARIZATION-AGILE ANTENNAS," the disclosures of which are incorporated herein by reference.

GOVERNMENT RIGHTS

This invention was made with government support under Grant # ECS0524720 awarded by the National Science Foundation. The government has certain rights to this invention.

BACKGROUND

1. Field of the Invention

The present invention relates generally to wireless communication. More particularly the present invention relates to wireless communication using radio frequency signals.

2. Related Art

Wireless communications systems, and in particular multiple-input multiple-output (MIMO) systems, have achieved remarkable capacity gains in the last decade. While theoretical performance limits can be calculated for many wireless communications scenarios, often system implementations fail to achieve more than a small fraction of the theoretically available performance. Much effort has been exerted in developing complex signal processing algorithms which, in some cases, provide only a few decibel of improvement.

MIMO systems can provide large improvements in capacity relative to single-input single-output (SISO) systems. In theory, the available capacity of a radio channel can increase linearly with the number of antennas at either the transmitter or receiver. Unfortunately, complex signal processing is generally required in order to obtain the increased throughput. The size and cost impact of adding antennas and cost of increased signal processing has slowed the adoption of MIMO technology. The impact of additional antennas and processing has caused some to view MIMO as impractical for mobile communications systems.

Simple techniques for providing capacity improvement in wireless communications are therefore highly sought after.

SUMMARY

Briefly, and in general terms, the invention is directed to wireless communications systems and methods which can provide increased performance based on adapting to the polarization characteristics of the radio communication channel.

In some embodiments, a mobile communication system can include a first terminal and a second terminal. Either or both of the terminals may be mobile. The first terminal and the second terminal are capable of communicating via radio signals propagated through a changing propagation channel. The second terminal includes at least one polarization agile antenna for transmission/reception of radio signals using any one of a plurality of polarization modes. The second terminal also includes a polarization selector coupled to the at least one polarization agile antenna to select one of the plurality of polarization orientations substantially matching a polarization orientation preferentially propagating through the changing propagation channel.

In some embodiments, a particular polarization-agile antenna may include a ground plane, a patch surface disposed proximate to the ground plane, and a first feed and a second feed coupled to the ground plane and the patch surface. The first feed and second feed can be disposed along diagonals extending from a center of the patch surface and extending to adjacent corners. Three switches can be electrically connected between the ground plane and the patch surface, with one switch disposed at a center of each side of the patch surface except for the side between the adjacent corners. The polarization orientation of the antenna is thus determined by the state of the switches and relative power distribution between the first feed and the second feed.

In some embodiments, a method for predicting the performance of a mobile communication system having communications terminals communicating through a communication link is provided. The method can include forming a model of the communications terminals and creating a channel model of a changing propagation channel of the communication link. The channel model can include an accounting of polarization-dependent propagation effects. The method may further include normalizing a channel matrix portion of the channel model using an extended polar normalization. The channel model and the communications terminal models may be used to predict performance of the mobile communication system.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENT(S)

Additional features and advantages of the invention will be apparent from the detailed description which follows, taken in conjunction with the accompanying drawings, which together illustrate, by way of example, features of the invention. In describing embodiments of the present invention, the following terminology will be used.

The singular forms "a," "an," and "the" include plural referents unless the context clearly dictates otherwise. Thus, for example, reference to "an antenna" includes reference to one or more of such antennas.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "from 1 to 5" should be interpreted to include not only the explicitly recited values of 1 and 5, but also include individual values (e.g. 1, 2, 3, etc.) and sub-ranges within the indicated range (e.g., 1-2, 1-3, 2-4, etc.). This same principle applies to ranges reciting only one numerical value and should apply regardless of the breadth of the range or the characteristics being described.

As used herein, the terms "about" and "substantially" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art. The exact degree of deviation allowable may in some cases depend on the specific context.

Figure 1:
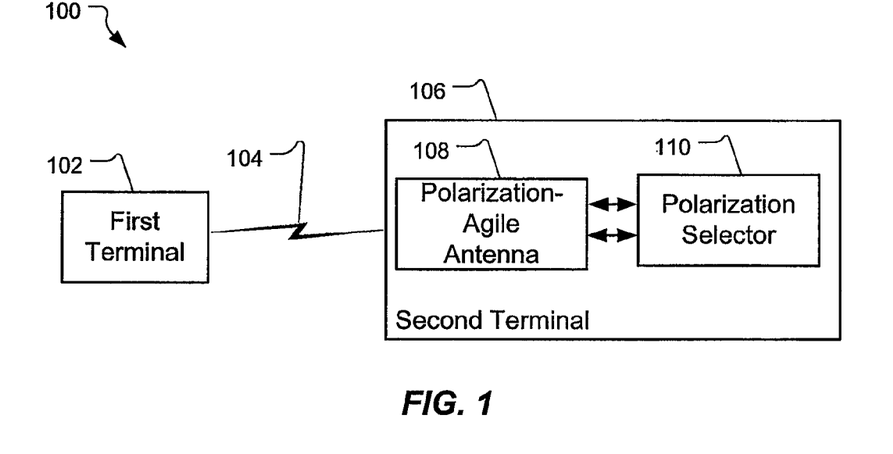
FIG. 1 is a block diagram of a mobile communication system in accordance with some embodiments of the present invention.

Turning to the present invention, some embodiments include a mobile communication system. As shown in FIG. 1, the mobile communication system 100 can include a first terminal 102 and a second terminal 106, where the second terminal is mobile. The first terminal may also be mobile, or may be fixed. The first terminal and the second terminal communicate via radio signals 104 propagated through a changing propagation channel. For example, the first terminal may be a cellular base station and the second terminal may be a mobile handset.

The second terminal 106 can include a polarization-agile antenna 108 for transmission/reception of radio signals. In other words, the polarization-agile antenna may be used for transmission of radio signals into the changing propagation channel, reception of radio signals from the changing propagation channel, or both. The polarization-agile antenna is capable of using any one of a plurality of polarization orientations. As a specific example, the polarization-agile antenna may be able to selectively operate in linear horizontal, linear vertical, and other polarizations. Of course, other combinations of polarizations may be provided as alternative or additional modes of operation.

A polarization selector 110 is coupled to the polarization-agile antenna 108 to select one of the plurality of polarization orientations. The polarization orientation can be selected to substantially match a polarization orientation preferentially propagated through the changing propagation channel.

The polarization-agile antenna 108 can provide two or more selectable polarization orientations. Of course, depending on the polarization orientations provided by the polarization-agile antenna, the antenna may not perfectly match the preferentially propagated polarization. For example, an antenna providing polarization orientations of 0 degrees and 90 degrees may provide a polarization orientation matched to within about +/−45 degrees of the radio channel. As another example, an antenna providing polarization angles of 0, 45 and 90 degrees may provide a polarization orientation matched to within about +/−22.5 degrees. These selectable polarization orientations can also be referred to as spokes. Generally, but not always, in some embodiments a polarization-agile antenna having n selectable polarizations may provide polarization orientations rotated by 180/(n-1) relative to each other. Alternately, in some embodiments (for example, a mechanically rotatable dipole), a polarization-agile antenna may have a continuously variable polarization orientation.

In general, the larger the number of polarization orientation selections provided by the polarization-agile antenna, the more closely the antenna can be matched to the polarization orientation preferentially propagated through the changing propagation channel. Accordingly, the polarization selector allows the second terminal 106 to adapt to the polarization characteristics of the radio communication channel. If desired, a polarization agile antenna and polarization selector may also be provided at the first terminal 102 as well.

Various techniques for selection of the polarization orientation can be used. For example, the polarization selector 110 may select the polarization orientation based on relative signal strengths received at the second terminal 106 as a function of polarization orientation. For example, signal strength for the various polarization orientations of the antenna may be periodically sampled, and the polarization orientation having the highest signal strength used. Alternately, the selection may be based on other metrics, such as capacity, channel-matrix degrees of freedom or independent basis modes, diversity gain, signal to noise ratio, signal to interference ratio, and the like. It will be appreciated that the first terminal 102 and the second terminal may also include radio communications equipment (not shown) commonly included in radio communications systems, such as transmitters, receivers, upconverters, downconverters, signal processing, modulators, demodulators, data sources, data sinks, and the like.

As another example, the polarization selector 110 may select the polarization orientation based on feedback from the first terminal. For example, the first terminal 102 may measure received signal level, signal to noise ratio, signal to interference ratio, or similar quantities using different polarization orientations, and provide feedback to the second terminal 106 as to which polarization orientation to use. As another example, either of the first or second terminals may select polarization orientations based on other information available at the first or second terminal, such as adjacent cell frequency/polarization assignments, or the like.

Providing the ability for the second terminal 106 to adapt to the polarization of the channel can allow the performance of the mobile communication system to be greatly enhanced. For example, in the case of a mobile handset, the orientation of the handset relative to the base station antennas can vary widely. Although a received signal at the handset may have a fixed polarization relative to the earth's surface, the polarization relative to the handset antenna changes as the handset orientation is changed. Prior modeling has typically failed to take into account this effect, using for example, a fixed 30 degree elevation angle of the handset. In actuality, usage of a cell phone sometimes includes tilting the head to either side to hold the handset against a shoulder or switching from the right hand to the left depending on user preference. The handheld device can thus be subject to polarization mismatch losses resulting from random orientation relative to the fixed base-station transceiver.

Accordingly, from the perspective of the handset, the channel characteristics can include changing polarization. The inclusion of a polarization-selector with a polarization-agile antenna in the handset can allow the handset to adapt to the polarization-orientation received. Similarly, the polarization orientation used to transmit may be selected to line up transmitted signals to the preferred polarization for the base station receiver. Accordingly, a polarization-agile antenna can benefit both transmission and reception for the mobile handset and in some embodiments can be performed without modification to the base station. Moreover, the polarization matching gains can be achieved without using a complex beam forming array at the base station.

Implementation of the polarization selector can take advantage of existing signal processing present within the mobile handset. For example, some handsets include functionality for mobile-assisted handoff, wherein the handset makes measurements of signal levels from multiple base stations and reports this information back to the current base station the handset is in communication with. Performing the measurements can include tuning the handset receiver to different channels (frequencies, time slots, codes, or combinations thereof). This functionality can be straightforwardly extended to include measuring signal levels at different polarization selections and, if desired, reporting these measurements back to the base station. Accordingly, implementation of polarization adaptation in the handset need not add significant cost or complexity to the handset.

Figure 2:
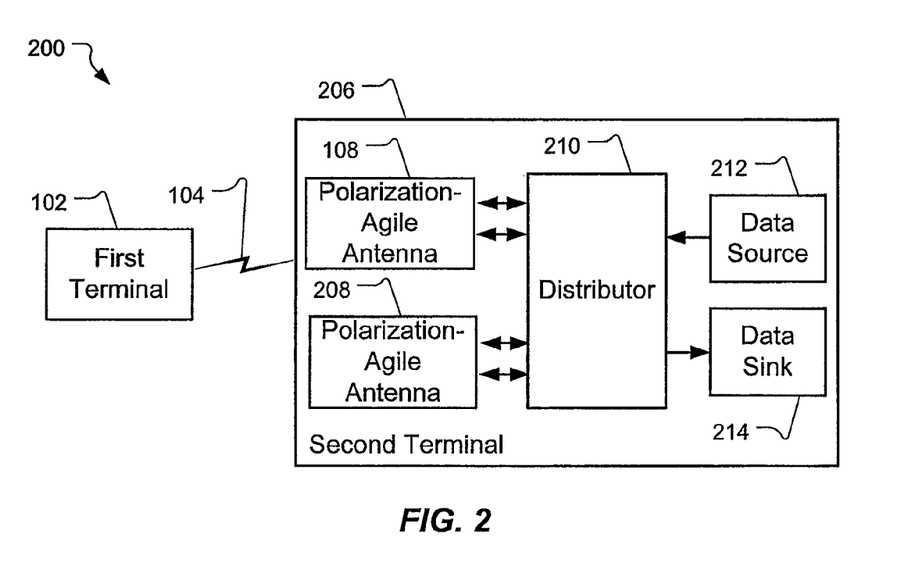
FIG. 2 is a block diagram of another mobile communication system in accordance with some embodiments of the present invention.

In other embodiments of the present invention, a terminal can include an array of polarization-agile antennas. For example, as shown in FIG. 2, in some embodiments, a communications system 200 can include a first terminal 102 and a second terminal 206, where the second terminal includes two (or more) polarization-agile antennas 108, 208 and a distributor 210 coupled to the antennas to control polarization selection and power distribution between the antennas.

For example, the distributor 210 can switch between polarization-diversity, space-diversity operation, and a combination of both. Space diversity operation may be desirable when there is only one predominant polarization mode propagated by the channel. The distributor may select the same polarization orientation for both antennas 108, 208 that is matched to the predominant polarization mode propagated by the channel, and then switch, combine (for receive), or split (for transmit) signals to the antennas based on space diversity algorithms. Alternately, when different polarization modes are present and independently fading, polarization diversity operation may be desirable. In this case, the distributor may set the antennas to different polarization orientations, and switch, combine, or split signals based on polarization diversity algorithms.

When multiple antennas are present, operation in single-input multiple-output (SIMO) multiple-input single-output (MISO), or multiple-input multiple-output (MIMO) is possible in some embodiments of the invention. Multiple polarization-agile antennas can be combined into a polarization-agile antenna array, which can be used in various ways to enhance the performance of a communication system. For example, in reception, individual antennas can be electronically rotated to match various polarizations which are found to have high signal strength. In transmission, individual antennas may be electronically rotated to provide one or more polarization directions which are use for transmission. Alternately, all of the antennas within the array may have their polarization rotated in similar directions, for example, to align all antennas to a preferred polarization direction. MIMO system, may for example, use techniques such as space-time-coding, D-BLAST, V-BLAST, Turbo-BLAST, and similar techniques.

Depending on the particular MIMO approach, various amounts of channel state knowledge are used at the receiver. When no channel state information is available, the transmitter may equally allocate transmit power to various sub-channels. Sub-channels, may for example, be individual antennas, individual polarization orientations, codes, or combinations thereof. The receiver may use polarization matching (through polarization-agile receive antennas), beam forming, equalization, coding, and other techniques to recover the transmitted data.

When partial channel state information is available (for example, provided by feedback from the receiver to the transmitter), transmit power may be preferentially allocated to various sub-channels. Partial channel state information may, for example, be obtained by the receiver sampling signal to noise ratio, signal to interference ratio, error rates, etc. for different sub-channels. The transmitter may use polarization matching (through polarization-agile transmit antennas), beam forming, coding, and other techniques.

More complete channel state information can be obtained by the receiver periodically estimating the channel response. Such estimation can be obtained, for example, by transmission of probe or pilot sequences from the transmitter that are used by the receiver to determine the changing propagation channel response. Virtual Eigen channels can be formed based on decomposing the changing propagation channel response. Transmission or reception on the virtual Eigen channels can use beam-forming techniques and power allocation to the virtual Eigen channels based on water-filling techniques. The decomposition can use spatial dimensions alone to form spatial Eigen channels, use polarization dimensions alone to form polarization Eigen channels, or can use a combination of spatial and polarization dimensions to form spatio-polarization Eigen channels. Selection of spatial and polarization modes may be based on maximizing predicted capacity for the changing propagation channel, for example, based on measurements or predictions of the channel response. Improved predictions can be obtained, for example, using an extended polar normalization as described further below in accordance with some embodiments of the invention.

Different data streams can be transmitted over the Eigen channels to provide increased throughput relative to conventional SISO in some embodiments of the invention. For example, a data source 212 may be coupled to the distributor 210 and supply demultiplexed data for transmission over the Eigen channels. As another example, a data sink 214 may be coupled to the distributor to receive and multiplex data received over the Eigen channels.

The ability to select between spatial and polarization diversity or use both simultaneously in the mobile communication system 200 may provide significant performance enhancements. For example, as alluded to above, orientation of mobile handsets can vary widely. Polarization mismatch losses can be recovered by allowing for selection of matched polarization orientations. In other words, the individual alignments of individual antennas 108, 208 can be electronically rotated to match the preferred polarization of the channel.

Depending on the channel conditions, either polarization diversity, spatial diversity, or a combination of both may prove more beneficial, and switching to the more advantageous mode is possible. MIMO Eigen channel decomposition can include polarization as an additional dimension over space, potentially providing greater throughput gains.

Various polarization-agile antennas can be used in some embodiments of the present invention. For example, the polarization-agile antenna can be a patch antenna. A patch antenna can have a single feed, a dual feed, or more feeds. As another example, the polarization-agile antenna can be a plurality of dipoles, each having a different polarization orientation. As yet another example, the polarization-agile antenna can be a planar inverted F antenna (PIFA) extended to provide multiple polarizations.

Figure 3A:
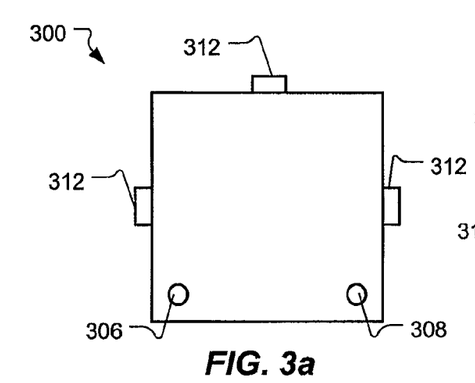
FIG. 3a is a top view and FIG. 3b is a side view of a dual feed patch antenna in accordance with some embodiments of the present invention.
Figure 3B:
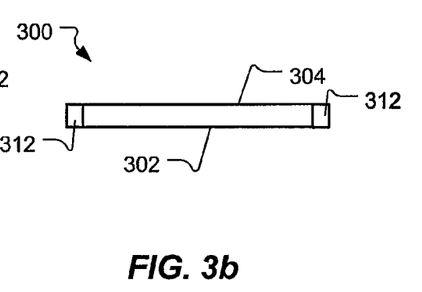

As a specific example, FIG. 3a and FIG. 3b illustrate a dual feed antenna 300 providing four different polarizations oriented at substantially 0 degrees, substantially 45 degrees, substantially 90 degrees, and substantially 135 degrees relative to each other in accordance with some embodiments of the invention. The dual feed antenna includes a ground plane 302 and a patch surface 304 disposed proximate to the ground plane. A first feed 306 and a second feed are coupled to the ground plane and the patch surface and disposed at positions along diagonals extending form the center of the patch surface to adjacent corners. For example, the first feed and the second feed may be positioned proximate to the corner. As another example, the first feed and the second feed may be positioned closer to the center of the patch, for example two-thirds of the way along the diagonal toward the center of the patch. The positioning of the feed along the diagonal may be adjusted to provide the desired impedance at the feed. The side 310 of the patch antenna between the feeds can be referred to as the feed side. Three switches 312 are electrically connected between the ground plane and the patch surface, one switch disposed at a center of each side of the patch surface except for the feed side. The switches may be, for example, PIN (positive intrinsic negative) diodes, MEMS (micro-electro-mechanical systems) switches, or the like. If desired, a switch, power divider, phase shifter, or combinations thereof may be coupled to the first feed and the second feed to provide a common feed. The antenna is able to produce polarization orientations of 0 degrees, 45 degrees, 90 degrees, and 135 degrees, depending on the state of the switches and the relative power distribution between the first feed and the second feed.

Performance of mobile communication systems, for example as described above, will now be described in accordance with some embodiments of the present invention. In general, as alluded to above, mobile wireless devices are likely to be rotated out of their optimal polarization, thereby experiencing significant power losses. In short, this loss is because a single-feed antenna cannot generally collect all available power in both orthogonal polarizations or at all orientations. Using a polarization-agile antenna can recover significant fractions of the rotation-induced losses both in switched-antenna diversity and capacity calculations. Moreover, using a polarization-agile antenna can provide benefits in systems using polarization diversity, and enhance the performance of systems using spatial diversity. In spatial diversity, multiple antennas sample various points of constructive or destructive interference of a set of electromagnetic waves of a given polarization. In polarization diversity, however, orthogonally polarized antennas sample energy arriving with either of two orthogonal polarizations. The two polarizations generally fade independently and can be subject to power imbalances and varying degrees of cross-coupling in the environment. Polarization diversity can be a useful source of performance gain, as polarizations generally fade independently and can be subject to power imbalances and varying degrees of cross-coupling in the environment Polarization aspects of the performance prediction are specifically addressed to avoid normalization errors that have been made in some prior art predictions of system capacities.

The cross-coupling or cross-polarization, $\chi$, of a channel is a measure of the degree to which transmitted power of a given polarization is converted to an orthogonal polarization via channel scattering. A general dual-polarized channel matrix model can be used to express the way cross coupling characterizes channel behavior. A channel matrix, H, is defined for a narrowband channel, to describe the relationship between the transmit voltages, x, present at $N_T$ transmit antennas and the receive voltages, y, present at $N_R$ receive antennas as:

$$\underset{N_T \times 1}{y} = \underset{N_T \times N_R}{H} \underset{N_R \times 1}{x}. \tag{1}$$

The elements of H may represent purely co-polarized elements or cross-coupling may be included in a partitioned form reflecting the receive and transmit polarizations of corresponding antennas via the subscripts V or H, representing vertical, and horizontal polarizations, respectively:

$$\underset{N_T \times 1}{y} = \underset{N_T \times N_R}{H} \underset{N_R \times 1}{x} = \begin{bmatrix} H_{VV} & \sqrt{\chi} H_{VH} \\ \sqrt{\chi} H_{HV} & H_{HH} \end{bmatrix} x. \tag{2}$$

Alternately, different polarizations (e.g., left-hand circular, right-hand circular, etc.) may be accounted for if desired. Channel capacity may be computed from an appropriately normalized form of this channel matrix, $H_{norm}$, depending on the level of channel state information available at the transmitter. In the absence of channel state information, the transmitter assigns equal power to each transmitter, and equal power capacity is computed as $$C_{EP} = \log_2 |I + (SNR/N_T) H_{norm} H_{norm}^H| \tag{3}$$

where SNR is the signal to noise ratio, $|A|$ is the determinant of A and $A^H$ is the conjugate transpose of A. When complete knowledge of the channel is available, optimal power allocation is performed using the water filling algorithm and generally surpasses $C_{EP}$.

To separate large scale path loss effects from small scale fading processes, measured or simulated instances of the channel matrix are generally normalized via some normalization constant, K, to achieve a unity power constraint, $E\{|H_{norm,\ ij}|^2\}=1$, over all i and j, where $H_{norm}=H/K$. The standard normalization constant, $K_{standard}$ may be expressed in terms of the Frobenius norm as:

$$K_{standard} = \sqrt{\frac{E\{\|H\|_F\}}{N_T N_R}} . \qquad (4)$$

Previously, standard normalization has been obtained by specifying the distribution of H as complex normal with unity variance: $H_{ij} \sim CN(0,1)$. The ubiquitous standard normalization is appropriate in some richly scattering environments when identical antennas are used in an array whose inter-element spacing is sufficiently de-correlating (typically using antenna spacings of at least a half wavelength). The standard normalization, however, leads to incorrect conclusions about channel capacity based on exploiting polarization for MIMO.

The first shortcoming of the standard normalization is evident when $\chi$ is small. Consider a channel where $\chi=0$, and two antenna choices are available: (A) two vertically polarized antennas and (B) a single vertical and a single horizontal-polarized antenna at both the receiver and transmitter. For illustration, it is assumed these antennas have perfect cross-polarization discrimination (can only sense their nominal polarization) although it will be appreciated that this is only an approximation. Upon normalizing for the path loss of the channel, both choices lead to $E\{|H_{11}|^2\}=E\{|H_{22}|^2\}=1$. But $E\{|H_{12}|^2\}=E\{|H_{21}|^2\}=1$ only in co-polarized case (A), while $E\{|H_{12}|^2\}=E\{|H_{21}|^2\}=0$ in case (B) due to the inability of these ideal receive antennas to detect any power from the cross-polarized transmit antennas. The standard normalization artificially magnifies the channel matrix of case (B) to $E\{|H|\}=\sqrt{2}I$ to compensate for the off-diagonal zero entries in H. This leads to the incorrect conclusion that the capacities in each case appear identical. Instead, case (B) should be viewed as an illustration of the uncoupled transmission line in which each receiver only senses the power of one transmitter and has a capacity penalized by input power division: $C=2 \cdot \log_2(1+SNR/2)$, where SNR is the signal to noise ratio of total received power divided by the noise power at the receiver. In case (A), each transmitter senses all of the input power and is power advantaged with $C=2 \cdot \log_2(1+SNR)$.

As another example of the shortcomings of the standard normalization, consider that H-H co-polarized signals often experience a power disadvantage relative to V-V co-polarized signals. In such a case, consider using (A) just vertical-polarized antennas, or (B) one vertical- and one horizontal-polarized antenna at both transmit and receive sides of a communications link in a channel with $\chi=0$. If all horizontally polarized incident energy is absorbed by the channel near the receiver (e.g., through the presence of horizontal ground planes) the horizontal-polarizated antennas are effectively useless. If the transmitter is uninformed, the equal-power capacity is $C_{EP}=1 \cdot (1+SNR/2)$. An informed strategy would achieve the water filling solution of sending all of the power through the vertical-polarized link, $C_{WF}=1 \cdot \log_2(1+SNR)$. Thus, case (B) can at best achieve a SISO capacity result, $C=\log_2(1+SNR)$. Instead, the standard normalization overcompensates for zeros in the channel matrix and results in an incorrect estimate of capacity of $C=1 \cdot (1+2 \cdot SNR)$.

Yet another deficiency in the standard normalization is evident when the channel is cross-polarizing. Consider choosing between the cases of (A) two vertical polarized, or (B) one vertical- and one horizontal-polarized element at each end of a cross-polarizing channel in a situation where the energy arriving at the receiver is split equally across the vertical and horizontal polarization regardless of its original linear polarization in this channel. Undetectable horizontal-polarized power arrives at the antennas in case (A) and is accounted for. In case (A), each receiver can sense just the vertical-polarized half of the power arriving from each transmitter. In case (B), one antenna can sense only the vertical-polarized half and the other can sense only the horizontal-polarized half of the power arriving from each transmitter. Thus, the maximum capacity in either case is $2 \cdot \log_2(1+SNR/2)$—not $2 \cdot \log_2(1+SNR)$ as obtained from the standard normalization.

Thus, the standard normalization artificially inflates the transmit power as the channel becomes increasingly subject to cross-coupling. Although such an approach is appropriate in some design situations, it results in ignoring the presence of cross-coupled energy and does not reward approaches intended to collect it. Accordingly, it appears that a potentially significant performance gain that could be obtained using polarization-agile antennas has been ignored by parts of the mobile communications industry.

In contrast, in some embodiments of the present invention, performance is predicted using an extended polarization normalization. The extended polar normalization can include the effects of cross-coupling:

$$K_{extended} = \sqrt{\frac{(1+\chi)E\{\|H_{VV}\|_F\}}{N_{T-VV} N_{R-VV}}} . \qquad (4)$$

A unity-power constraint is imposed over the dominant (generally vertical) co-polarized sub-channels. The additional inclusion of $\sqrt{(1+\chi)}$ achieves a fixed power constraint into the channel—independent of whether the channel cross-polarizes that input power or not.

Figure 4:
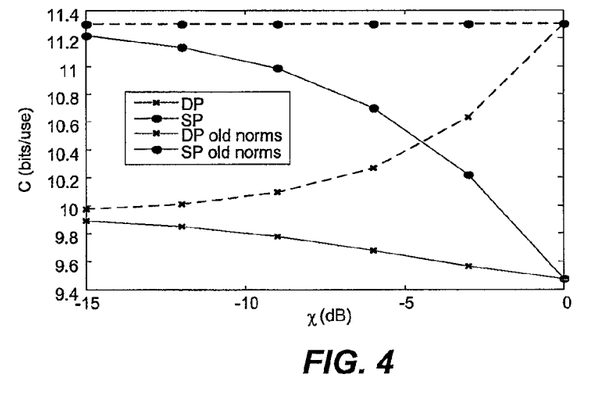
FIG. 4 is a graph showing capacity predictions as a function of cross-coupling for single- and dual-polar design using standard normalization as compared to extended normalizations in accordance with some embodiments of the present invention.

FIG. 4 compares capacity prediction as a function of cross-coupling of single-polar (SP) and dual-polar (DP) design using the standard (and related) normalizations (labeled "SP old norms" and "DP old norms" and shown in dotted lines) as compared to the new "extended normalization" (labeled "SP" and "DP" and shown in solid lines) described further below.

Standard normalizations predict that the single-polar (SP old norms) capacity remains constant over environments regardless of cross coupling and the (DP old norms) capacity climbs up to match this capacity as cross coupling becomes increasingly severe. This is because the standard normalizations inflate the transmit power to maintain a fixed receive power and thus incorrectly suggest that increased cross-coupling actually increases the capacity available to cross-polarized antenna deployments.

Using the extended normalization, it can be seen that the predicted capacity of the dual-polar design (DP) actually degrades very slightly in the presence of cross coupling and drops very significantly in single-polar designs (SP). The extended normalization described herein (eqn. 5) more accurately predicts capacity when there is increased cross coupling by correctly taking into account the cross coupling.

FIG. 4 represents 1000 simulated realizations of a 2×2 channel matrix in which each $H_{ij}$ has Rayleigh amplitude distribution and uniform phase distribution. In the dual-polar (DP) cases, a cross-coupling is also applied as given in (eqn. 2). The "old norms" curves represent normalization with the standard normalization (eqn. 3). The first two curves (DP) and (SP) are computed with the extended polar normalization (eqn. 4). The extended normalization makes the impact of cross-coupling clear for a given signaling choice and fixed transmit power: increased cross coupling leads to degraded performance.

Figure 5:
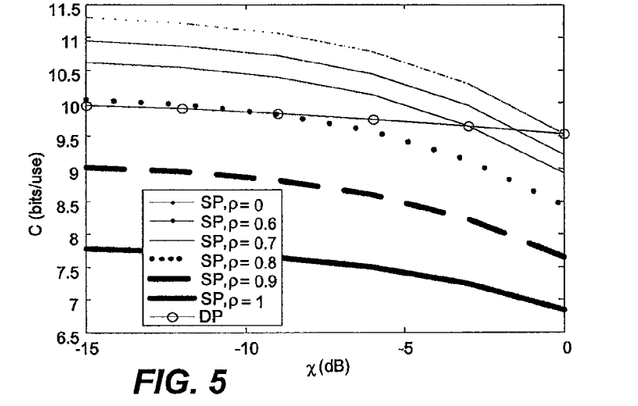
FIG. 5 is a graph showing capacity predictions as a function of cross-coupling with co-polar signal correlation in accordance with some embodiments of the present invention.

Although FIG. 4 shows situations where single-polar antenna deployments outperform dual-polar approaches, FIG. 5 shows a counter example. Although orthogonal polarized channels often fade fairly independently, co-polarized channels often do not—particularly when co-polarized elements are closely spaced. The receive and transmit power correlation matrices, $R_{Rx}$ and $R_{Tx}$, can be specified for a new ensemble of simulated instances of $H_{correlated}$ from a power-correlation matrix. The ensemble of channel matrices can be generated to match an assumed power correlation of $$R_{Rx} = R_{Tx} = \begin{bmatrix} 1 & \rho \\ \rho & 1 \end{bmatrix},$$

by computing $H_{correlated} = U_{Rx} \Lambda_{Rx}^{1/2} H_{iid} \Lambda_{Tx}^{1/2} U_T^H$ via the singular value decomposition $U_{Rx} \Lambda_{Rx} V_{Rx}^H = R_{Rx}$ and corresponding transmit decomposition. FIG. 5 shows that, for sufficiently high co-polar signal correlation, dual-polar arrays can outperform co-polar arrays. Accordingly, using the extended normalization can lead to the surprising conclusion that polarization diversity is a viable option for MIMO antenna systems, a result that has been largely obscured by prior use of standard normalizations.

From the foregoing, it will now be apparent that both SISO and MIMO systems, for example, deployed on a portable handset, can benefit significantly from switched polarization diversity. Expected performance gains were quantified for various system configurations as shown in graphs in FIGS. 6-10. The graphs were produced by generating 20,000 random environments and normalizing to the average power detected by a reference dipole antenna as it is swept over a 50-λ range of locations. Whenever the polarization of the impinging fields is unknown, an additional sweep of antenna orientations is made to find the best polarization alignment for the spatial sweep of the reference antenna. Each figure reports the likelihood that the SNR achieved by a certain antenna array design via selection diversity exceeds a given level. For comparison, theoretical curves are included for the probability, Ps, that the SNR under selection combining is below the specific value "SNR," for M equal-mean, Rayleigh-distributed branch power signals:

$$Ps = (1 - e^{-SNR})^M = (\text{single branch Rayleigh cdf})^M. \quad (5)$$

The second half of (eqn. 5) is a reminder that Ps is the cumulative density function (cdf) of the Rayleigh distribution raised to the $M^{th}$ power. The simulated and theoretical curves in FIG. 6 agree very well for dipoles, showing that a single dipole and a pair of dipoles, respectively, achieve about 0.4 and 0.5 effective orders of diversity when subject to rotation. This indicates a very significant loss in diversity order from 2 to 0.5 for the traditional paired dipoles and has significant consequences for the outage probabilities of a randomly oriented handset using two parallel dipoles.

Figure 6:
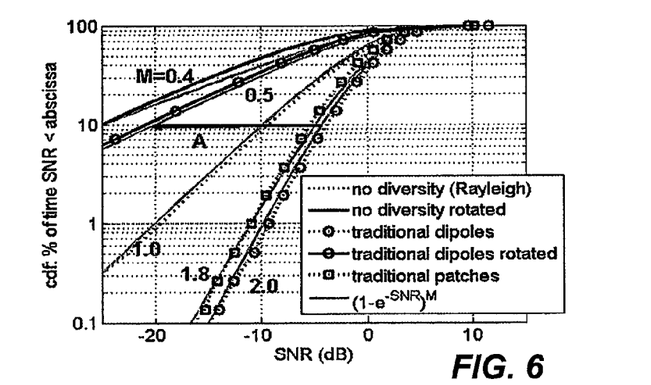
FIGS. 6 and 7 are graphs showing cumulative density function of signal to noise ratio for selection diversity for various antenna arrangements in accordance with some embodiments of the present invention.

FIG. 6 shows SNR cdf's via selection diversity for rotated (solid curves) and idealized, unrotated dipole arrays (dashed curves). A single half-wavelength dipole represents the "no diversity" case and follows a Rayleigh distribution when unrotated. The gray curves are taken from (eqn. 5) and express the effective diversity order as the exponent, M, showing very close agreement between the simulated and theoretical results. Notice that the diversity order ratio of 2.0/0.5=4 indicates that the traditional dipoles cdf curve can be computed as the cdf of a pair of rotated dipoles raised to the fourth power. Thus, a pair of dipoles subject to random rotation has only ¼ of the effective diversity order typically predicted by traditional (unrotated) models. This realistic demonstration of loss is apparent when an array is rotated in three dimensions typical of handheld deployment but may not be noticed when rotation is constrained within a single plane.

The simulated and theoretical curves in FIG. 6 agree very well for dipoles, suggesting that a single dipole and a pair of dipoles, respectively, achieve about 0.4 and 0.5 effective orders of diversity when subject to rotation. This indicates a significant loss in diversity order from 2 to 0.5 for the traditional paired dipoles and has severe consequences for the outage probabilities of a randomly oriented handset using two parallel dipoles.

Traditional antennas can perform poorly when subject to random handset orientation. The simulated curves for a single vertical λ/2-dipole, labeled "no diversity," and the pair of parallel vertical dipoles, labeled "traditional dipoles," use the idealized fixed orientation imposed in most modeling and measurement campaigns. This fixed orientation assures optimal alignment with the polarization of the fixed base station, so these curves easily beat their rotated counterparts "no diversity rotated" and "traditional dipoles rotated," which are randomly oriented relative to the same 20,000 simulated environments. When concerned with communication system link-budget specifications for sufficient power to guarantee 90% link-reliability (the SNR falls below this level only 10% of the time), the fixed orientation of typical models predicts 17.5 dB of SNR unavailable to mobile users with randomly oriented devices (see marker A in FIG. 3). For a 99% reliability, the "traditional model" is therefore 28 dB overly optimistic.

Figure 7:
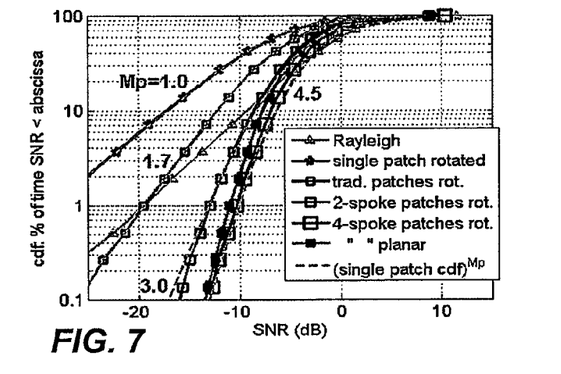

FIG. 7 illustrates SNR cdf's via selection diversity for polization-agile, 2-element array designs. "Rayleigh" is a single vertical dipole, which does not provide an accurate model for non-dipole antenna models. "Single patch rotated" is a single λ/2 patch. The other orthogonally oriented patch pairs are endowed with 2 or 4 spokes in "2-..." and "4-spoke patches rotated" and reconstrained to be coplanar in "4-spoke patches rot., planar". The dashed curves represent an exponentiation of the data in the "single patch rotated" curve and represent the effective diversity order relative to this single rotated patch. Notice as in FIG. 6, that each curve can be computed from any other by raising exponentially the cdf values in the base curve to the ratio of their Mp values. "4-spoke patches rotated" is the design offering the best diversity gain with only minor degradation when constrained to be fully planar.

A comparison of the dipole results of FIG. 6 with those computed for patch antennas in FIG. 7 indicates that diversity gains depend on antenna type. The curve "traditional patches rotated" in FIG. 7 is a pair of coplanar, vertical, bottom-fed, λ/2-square patch antennas commonly considered for MIMO applications in handsets. The curve falls well within the dipole curves "traditional model" and "traditional model rotated" of FIG. 6, showing that patches are both less benefited by optimal alignment and less penalized by rotation than dipoles are. In particular, for a 90%-reliability, patches can outperform dipoles by 8 dB.

This less extreme behavior is reflected in a rather different shape for the patch curves as compared to the dipole curves. The "trad. patches rot." curve has a much steeper slope and a different curvature than the "Rayleigh" curve in FIG. 7 or any of the curves in FIG. 6. Although these curves are quite different from the dipole curves, the patch curves are closely related to each other. Patch curves are well estimated by an exponential function of the cdf of the "single patch rotated curve" data: "(single patch cdf)$^{Mp}$." The exponent, Mp, can be interpreted as an effective diversity order relative to a single rotated patch and demonstrates the result that switched diversity offers nearly a two-fold (1.7-fold) increase in the effective diversity order for paired vs. single patches. Incomplete modeling of rotation incorrectly favors antennas with focused directivity. Instead, FIG. 7 helps demonstrate that the more distributed directivity of patches or comparable antennas is an important design feature of arrays for handheld devices.

FIG. 7 also demonstrates considerable further gains available from using switchable, polarization-agile elements in devices with random orientations. A rotated pair of "2-spoke patches" offers an effective diversity order of 3.0, while a rotated pair of "4-spoke patches" (e.g., as shown in FIGS. 3a and 3b) achieves an effective diversity order of 4.5. This level is very near the idealized cdf curve of the "traditional dipoles" in FIG. 6 and little additional improvement is likely to be obtained for 2-fold selection diversity combining even when the spoke count is increased beyond four. Of course, patches providing 2-spoke, 3-spoke, or 4-spoke can be used, and such patches may have single ports or dual ports. The choice will be dependent upon other design considerations, including, for example, desired cost, desired performance, and other factors. Depending on the cost trade-offs, switched polarization-agile antennas can inexpensively restore all but about 1 dB of the diversity losses for a 99% reliable system. This means that link budgets for the "4-spoke patches rotated" design need only add 1 dB of power rather than the 28 dB needed for the 2-dipole "traditional model rotated" design when a handset is subject to the rotation typical of cell-phone use.

As yet another option, the final black curve, "4-spoke patches, rot., planar," illustrates the value of using a 4-spoke design with two coplanar patches. This penalizes the orthogonal "4-spoke patch rotated" design by 0.5 dB but continues to considerably outperform the polarization non-agile design given by "traditional patches."

In short, the penalties imposed on traditional antenna arrays when random orientation is included in modeling handset use can be largely overcome with relatively low-complexity extension to use a polarization-agile antenna.

Similar performance benefits can be obtained in MIMO system using polarization-agile antennas within an array. MIMO systems can also include the simultaneous activation of multiple antennas In FIGS. 8 and 9, the number of transmitter and receiver antennas, $N_T$ and $N_R$, respectively, are $N_T=N_R=2$. Thus, the independent transmit signals are modeled as two sets of realizations of the angles of arrival, $\phi_{k1}$ and $\phi_{k2}$, magnitudes, $A_{k1}$ and $A_{k2}$, and phase variables, $\beta_{k1}$ and $\beta_{k2}$. This allows for the computation of a matrix of $V_i$'s: $[V_{i11}, V_{i12}; V_{i21}, V_{i22}]$ based on using two active elements—one spoke from each of the two polarization-agile antennas on the handset. This matrix, $V_i$, actually represents an instance of the narrowband channel matrix, H, relating the input and output bit streams, x and y, respectively as y=Hx.

For each simulated instance of H, an instantaneous estimate of the channel capacity is computed via the waterfilling algorithm. Although asymptotically optimal selection methods exist for receiver subset selection of two active elements among the many spokes, the problem is small enough to compute the capacity for each spoke pairing, and the largest value is selected. The Ergodic capacity, $C_E$, is then estimated as the average capacity over an ensemble of H's. Other statistics, such as outage capacities defined at a 1% ($C_{0.01}$) or 10% level ($C_{0.1}$), may be extracted from the capacity cdf. Of course, as described above, a normalization to the average power detected by an optimally aligned dipole swept over 50-$\lambda$, is used.

Figure 8:
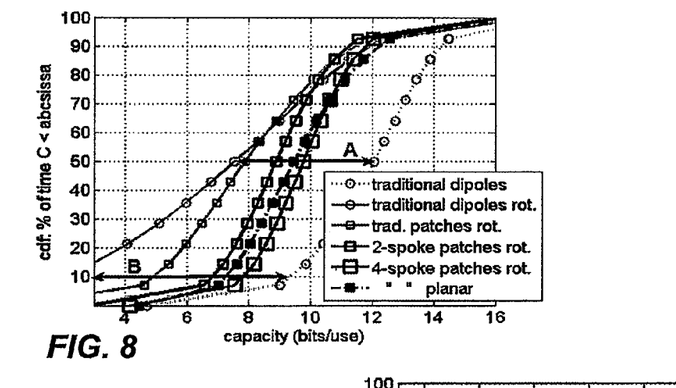
FIGS. 8, 9 and 10 are graphs showing cumulative density function of achievable capacity for switched, angle-diverse antenna arrays in accordance with some embodiments of the present invention.

The same polarization-agile designs that recovered diversity losses in SISO can recover capacity losses not typically modeled in MIMO systems. The traditional configuration of two parallel dipoles demonstrates these losses well. FIG. 8 illustrates capacity cdf's for switched, angle-diverse array designs. The polarization-aligned "traditional dipoles" support a capacity of $C_E=12$ bits/use, a value that drops to just 7.5 bits/use when subject to random orientation in "traditional model rotated" (see FIG. 8, marker A). Outage capacity losses are even more severe (see FIG. 8, marker B) though the outage capacity is much less catastrophic for patches subject to rotation than for dipoles. At an outage likelihood of 10% (90%-reliability), for example, patches outperform dipoles with a capacity of 5.5 bits/use as compared to just 2.2 bits/use for the "traditional model rotated." Both fall far below the 9 bits/use predicted by the perfectly oriented "traditional model."

The curves "2-spoke" and "4-spoke patches rotated" represent the improved capacities achieved by n-spoke switched patch antennas. Using two spokes recovers 25% of the $C_E$ losses indicated by FIG. 8 marker A. Using three spokes increases this to 40% recovery (not shown), while increasing the count to four spokes achieves 50% recovery of the $C_E$ losses. More spokes can be used, although less additional benefit is obtained for larger numbers of spokes.

Recovery of outage capacity, $C_{0.1}$, is even more impressive. Where the traditional dipole model predicts $C_{0.1}=9$ bit/use, only 2.2 bits/use are available under rotation (see FIG. 8 marker B). Nearly 5.5 bits/use are recovered with 4-spoke patches for a recovery of 80% of the rotation-induced losses.

Figure 9:
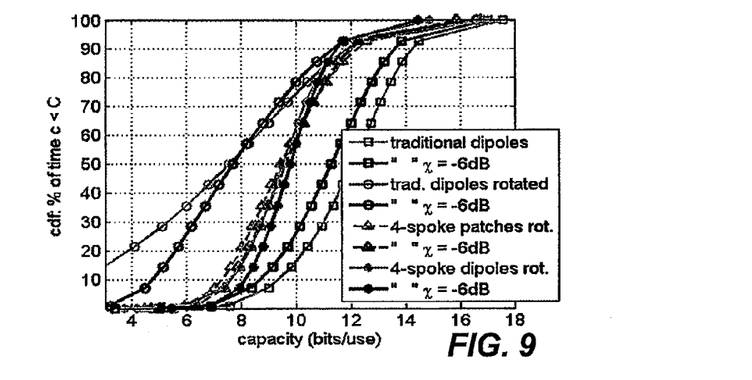

Channel depolarization can limit or destroy capacity gains available through orthogonal polarization channels, so it is helpful to consider its impact on these designs as well. Wireless channels often exhibit a cross-coupling of as much as −6 dB. FIG. 9 illustrates the impact to switched-antenna capacity of −6 dB channel polarization cross-coupling and shows that polarization cross-coupling does not uniformly impact the capacity of the various designs. Cross-polarization modestly impacts the 4-spoke designs but actually benefits the "trad. dipoles rotated" case by virtually guaranteeing polarization alignment to at least a part of the signal. Cross coupling has a large and generally negative impact on the idealized models "traditional model" and "trad. model rotated." The mean capacities of traditional patches (not shown) and "traditional dipoles $\chi=-6$ dB" indicate a loss of 0.8 bits/use. This reflects the difficulty of aligning simultaneously to both co- and cross-polarized components of the signal—a fact that is overlooked using certain common normalizations. In contrast, the outage capacity, $C_{0.1}$, of the rotated dipoles antennas increases from less than 2 bits/use to nearly 5 bits/use, and reflects the fact that a non-negligible cross-coupled signal is detectable even when the array is completely misaligned with the orientation of the stronger polarization component. However, cross-coupling has little impact on the polarization-agile design curves. The average capacity of "4-spoke dipoles rot., $\chi=-6$ dB" and "4-spoke patches rot. $\chi=-6$ dB" improve slightly by 0.2 bits/use and remain appropriate design choices in the presence of channel cross-coupling. The outage benefit is greater for dipoles than for patches due to the difference in their gain patterns.

Figure 10:
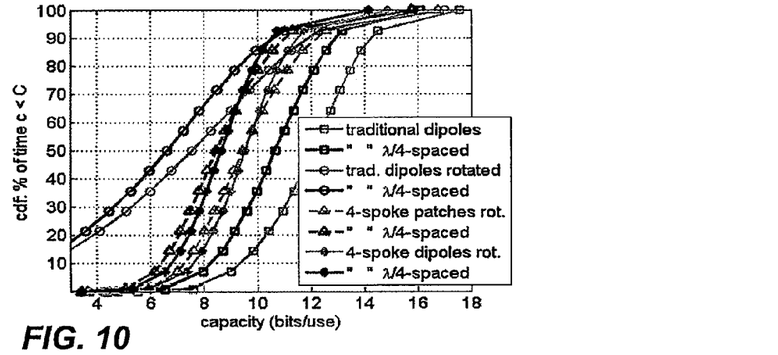

Although the switched, multi-spoke design provides the ability to recover rotation-induced losses exhibited by standard array designs (parallel elements targeting spatial diversity), linking polarization with MIMO leads to the somewhat contradictory idea of a compact design based on co-located elements. FIG. 10 illustrates the consequences of limited element spacing ($\lambda/4$) on the capacity of switched antenna designs (using the same naming convention as for FIG. 8). While limited spacing hurts both idealized and polarization-agile antennas by reducing signal decorrelation, such an approach may be of benefit in some situations. For example, current cell-phone frequencies near 1800 MHz may allow such a design to fit on wireless-enabled electronic organizers. The width of a planar pair of $\lambda_{air}/4$ patches spaced at their centers by $\lambda_{air}/4$ is $\lambda_{air}/2=8.3$ cm provides a smaller profile than the 12.4 cm otherwise needed for a spacing of $\lambda_{air}/2$. Of course, MIMO may be even more beneficial for cell-phones and other small handhelds when a higher frequency like 5.2 GHz allows this same dimension to drop to 2.9 cm. Unlike the previous study of non-zero cross-polarization, all of the curves in FIG. 10 are penalized by the consequent increase in the correlation of the MIMO sub-channels. The "traditional model $\lambda/4$-spaced," degrades by more than 1 bit/use to $C_E=10.4$ bits/use and the polarization-agile designs by about 0.6 bits/use to $C_E=8.6$ bits/use as seen in "4-spoke patches rot. $\lambda/4$-spaced" and "4-spoke dipoles rot. $\lambda/4$-spaced."

Similar performance gains for polarization-agile antenna arrays can be expected when larger numbers of antennas ($N_T=N_R=4$ and 10) are used. In general, it has been found that where the traditional model offers a capacity bounded by $C_E=N_R \log_2(\text{SNR})$, the 4-spoke design achieves $0.8 \, N_R \log_2(\text{SNR})$ rather than the $0.65 \, N_R \log_2(\text{SNR})$ achieved by the polarization non-agile traditional designs. Moreover, the benefits of polarization-agile antennas are also found to scale with array element count, offering $0.8 \, N_R \log_2(\text{SNR})$ rather than the $0.65 \, N_R \log_2(\text{SNR})$ achieved by traditional arrays subject to handset rotation even for large numbers of array elements.

Figure 11:
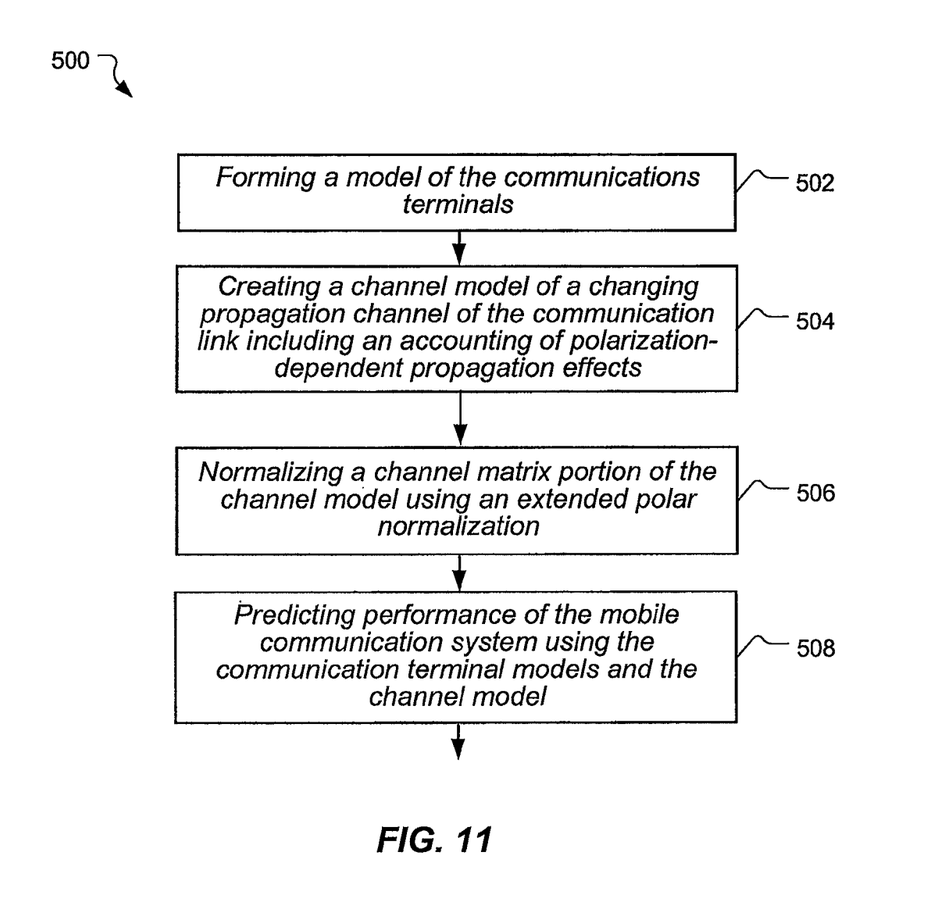
FIG. 11 is a flow chart of a method of predicting the performance of a mobile communication system in accordance with some embodiments of the present invention.

In general, FIG. 11 provides a flowchart of a method for predicting the performance of a mobile communication system having communications terminals and a communications link in accordance with some embodiments of the present invention. The method 500 can include forming 502 a model of communications terminals at each end of a communication link. For example, the model may take into account modulation formats, demodulator performance, transmission power levels, antenna gain and directivity, receiver sensitivity, and similar aspects. Another step of the method can include creating 504 a channel model of a changing propagation channel portion of the communication link. For example, the channel model may include distance, frequency, terrain characteristics, propagation characteristics, and an accounting of polarization-dependent propagation effects. One portion of the channel model can be a channel matrix, for example, describing correlation between different spatial, polarization and other dimensions.

The method can also include normalizing 506 the channel matrix using an extended polar normalization. For example, one extended polar normalization is described above.

The method can also include predicting 508 the performance of the mobile communication system using the communication terminal models and the channel model. By using the extended polar normalization, improved fidelity of the channel model is obtained, enabling more accurate simulation results to be obtained. For example, the extended polar normalization helps to quantify benefits of polarization-agility obtained by mobile communications systems as described above.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The invention claimed is:

1. A polarization agile antenna comprising:
    a ground plane;
    a patch surface disposed proximate to the ground plane;
    a first feed coupled to the ground plane and the patch surface, the first feed disposed at a position on a first diagonal extending from a center of the patch surface to a first corner of the patch surface;
    a second feed coupled to the ground plane and the patch surface, the second feed disposed at a position on a second diagonal extending from a center of the patch surface to a second corner of the patch surface adjacent to the first corner; and
    three switches electrically connected between the ground plane and the patch surface, one switch disposed at a center of each side of the patch surface except for the side of the patch between the first corner and the second corner, a polarization orientation of the antenna determined by the state of the switches and relative power distribution between the first feed and the second feed.

2. An antenna array comprising a plurality of polarization-agile antennas as in claim 1.

3. The polarization agile antenna of claim 1 wherein said antenna is configurable to operate between at least a linear horizontal and linear vertical polarization.

4. The polarization agile antenna of claim 3 wherein said mobile communication device comprises a polarization selector and is configured to transmit/receive radio signals using a selected one of a plurality of polarization modes.

5. The polarization agile antenna of claim 1 wherein said antenna is configured to select a polarization to substantially match the polarization of a signal in a changing propagation channel.

6. The polarization agile antenna of claim 1 wherein said polarization-agile antenna is included in a mobile communication device.

7. The polarization agile antenna of claim 1 wherein said polarization-agile antenna is included in a base station of a mobile communication network.

8. The polarization agile antenna of claim 1 wherein said antenna is configured to continuously alter the polarization orientation of said antenna.

9. The polarization agile antenna of claim 1 wherein said antenna is configured to select between a plurality of selectable polarizations.

10. The polarization agile antenna of claim 9 wherein said plurality of polarizations include 0, 45, 90 and 135 degree polarization orientations.

11. The polarization agile antenna of claim 9 wherein a said polarization agile antenna is configured to select a polarization based on relative signal strengths of a signal received by the antenna as a function of polarization orientation.

12. The polarization agile antenna of claim 9 wherein a said polarization agile antenna is configured to select a polarization based on a relative signal to interference ratio of a signal received by the antenna as a function of polarization orientation.

13. The polarization agile antenna of claim 9 wherein said polarization agile antenna is configured to select a polarization orientation based on a metric chosen from the group consisting of signal strength, signal to interference ratio, channel capacity, channel-matrix degrees of freedom, and channel matrix independent basis modes.

14. A method of manufacturing a polarization agile antenna, said method comprising:
    providing a ground plane;
    disposing a patch surface proximate to the ground plane;
    coupling a first feed to the ground plane and the patch surface, the first feed disposed at a position on a first diagonal extending from a center of the patch surface to a first corner of the patch surface;

coupling a second feed to the ground plane and the patch surface, the second feed disposed at a position on a second diagonal extending from a center of the patch surface to a second corner of the patch surface adjacent to the first corner; and electrically connecting three switches between the ground plane and the patch surface, one switch disposed at a center of each side of the patch surface except for the side of the patch between the first corner and the second corner, a polarization orientation of the antenna determined by the state of the switches and relative power distribution between the first feed and the second feed.

15. The method of claim 14 further comprising configuring said antenna to operate between at least a linear horizontal and linear vertical polarization.

16. The method of claim 14 further comprising configuring said antenna to select a polarization to substantially match the polarization of a signal in a changing propagation channel.

17. The method of claim 14 further comprising disposing said polarization-agile antenna in a mobile communication device.

18. The method of claim 17 wherein said mobile communication device comprises a polarization selector and is configured to transmit/receive radio signals using a selected one of a plurality of polarization modes.

19. The method of claim 14 further comprising disposing said polarization-agile antenna in a base station of a mobile communication network.

20. The method of claim 14 further comprising configuring said antenna to continuously alter the polarization orientation of said antenna.

21. The method of claim 14 further comprising configuring said antenna to select between a plurality of selectable polarizations.

22. The method of claim 21 further comprising configuring said antenna is to select a polarization based on relative signal strengths of a signal received by the antenna as a function of polarization orientation.

* * * * *